(12) United States Patent
Lucey et al.

(10) Patent No.: US 9,443,144 B2
(45) Date of Patent: *Sep. 13, 2016

(54) METHODS AND SYSTEMS FOR MEASURING GROUP BEHAVIOR

(71) Applicant: Disney Enterprises, Inc., Burbank, CA (US)

(72) Inventors: Patrick Lucey, Burbank, CA (US); Rajitha Navarathna, Brisbane (AU); Peter Carr, Burbank, CA (US); Daniel Candela, Burbank, CA (US); Iain Matthews, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 14/080,446

(22) Filed: Nov. 14, 2013

(65) Prior Publication Data

US 2014/0270483 A1 Sep. 18, 2014

Related U.S. Application Data

(63) Continuation-in-part of application No. 13/844,329, filed on Mar. 15, 2013.

(51) Int. Cl.
*G06K 9/00* (2006.01)
*G06T 7/20* (2006.01)

(52) U.S. Cl.
CPC ....... *G06K 9/00677* (2013.01); *G06K 9/00302* (2013.01); *G06K 9/00335* (2013.01); *G06T 7/2033* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS 4,950,069 A * 8/1990 Hutchinson ............ A61B 3/113
351/210
8,165,386 B1 4/2012 Moon et al.
(Continued)

FOREIGN PATENT DOCUMENTS

WO 2011031932 A1 3/2011

OTHER PUBLICATIONS

Fitzpatrick, Jason. "Fflick Harnesses Twitter for Crowdsourced Movie Reviews." Lifehacker. N.p., Aug. 4, 2010. Web. Mar. 9, 2016.*
Sharda, Ramesh, and Dursun Delen. "Predicting box-office success of motion pictures with neural networks." Expert Systems with Applications 30.2 (2006): 243-254.*
(Continued)

*Primary Examiner* — Chan Park
*Assistant Examiner* — Geoffrey E Summers
(74) *Attorney, Agent, or Firm* — Sheppard, Mullin, Richter & Hampton LLP

(57) ABSTRACT

Methods and systems for measuring group behavior are provided. Group behavior of different groups may be measured objectively and automatically in different environments including a dark environment. A uniform visible signal comprising images of members of a group may be obtained. Facial motion and body motions of each member may be detected and analyzed from the signal. Group behavior may be measured by aggregating facial motions and body motions of all members of the group. A facial motion such as a smile may be detected by using the Fourier Lucas-Kanade (FLK) algorithm to register and track faces of each member of a group. A flow-profile for each member of the group is generated. Group behavior may be further analyzed to determine a correlation of the group behavior and the content of the stimulus. A prediction of the general public's response to the stimulus based on the analysis of the group behavior is also provided.

28 Claims, 8 Drawing Sheets

(56) References Cited

U.S. PATENT DOCUMENTS

| | | |
|---|---|---|
| 8,244,537 B2 | 8/2012 | Kondo et al. |
| 8,274,523 B2 | 9/2012 | Ptucha et al. |
| 8,296,172 B2 | 10/2012 | Marci et al. |
| 2009/0094627 A1 | 4/2009 | Lee et al. |
| 2009/0244309 A1* | 10/2009 | Maison ............ G06K 9/00369 348/222.1 |
| 2010/0046797 A1 | 2/2010 | Strat et al. |
| 2010/0079585 A1 | 4/2010 | Nemeth et al. |
| 2010/0095318 A1 | 4/2010 | Wagner |
| 2010/0211439 A1* | 8/2010 | Marci .................. G06Q 10/10 705/7.29 |
| 2011/0161011 A1* | 6/2011 | Hasson ................ A61B 5/055 702/19 |
| 2012/0222057 A1 | 8/2012 | Sadowsky et al. |
| 2012/0229248 A1 | 9/2012 | Parshionikar et al. |

OTHER PUBLICATIONS

Zhu, Zhiwei, and Qiang Ji. "Robust real-time eye detection and tracking under variable lighting conditions and various face orientations." Computer Vision and Image Understanding 98.1 (2005): 124-154.*

Essa, Irfan A., and Alex P. Pentland. "Facial expression recognition using a dynamic model and motion energy." Computer Vision, 1995. Proceedings., Fifth International Conference On. IEEE, 1995.*

Glowinski, Donald, et al. "Toward a minimal representation of affective gestures." Affective Computing, IEEE Transactions on 2.2 (2011): 106-118.*

Jeffrey F. Cohn et al., "Automatic Analysis and Recognition of Brow Actions and Head Motion in Spontaneous Facial Behavior", Proceedings of the IEEE Conference on Systems, Man, and Cybernetics, Oct. 2004, pp. 610-616.

* cited by examiner

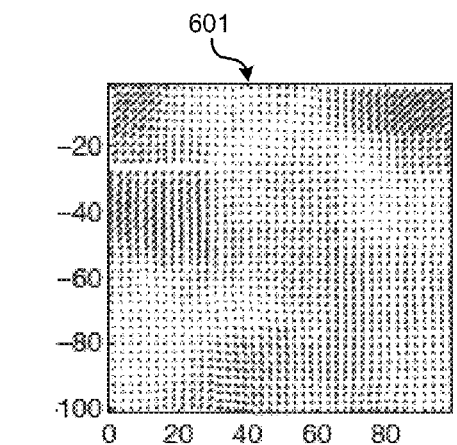
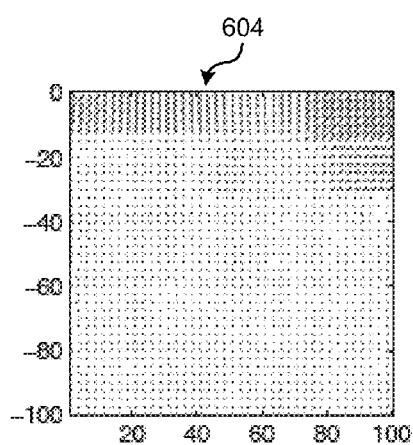
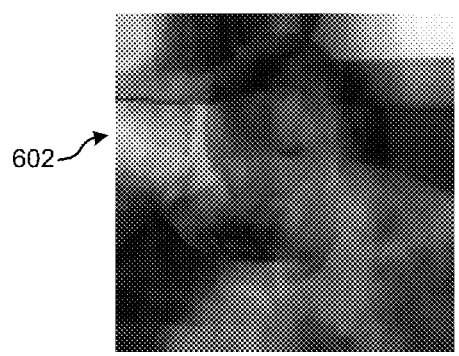
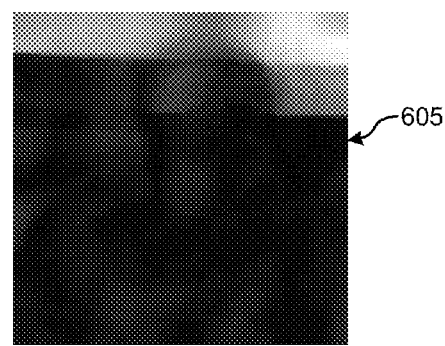
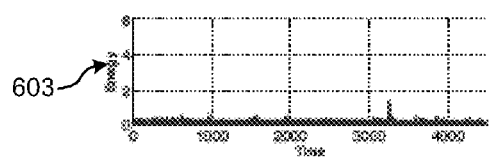
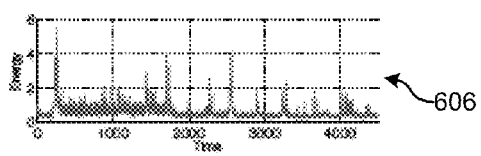
FIG. 6A        FIG. 6B

METHODS AND SYSTEMS FOR MEASURING GROUP BEHAVIOR

CROSS-REFERENCE TO RELATED APPLICATIONS

This application is a continuation-in-part of and claims the benefit of U.S. application Ser. No. 13/844,329, filed on Apr. 12, 2013, which is hereby incorporated herein by reference in the respective entirety.

TECHNICAL FIELD

The present application relates generally to image processing, more particularly, some embodiments relate to methods and systems for measuring group or audience behavior.

DESCRIPTION OF THE RELATED ART

A human's response to media content (for example, news, videos, lectures, TVs or radios), such as feelings and emotions, may be manifested through his or her gestural and physiological cues such as laughter and crying. Due to the usefulness of these responses in gauging media content impact, some people have tried to collect data on the behavior of the audience or the group in relation to the viewed media content. Such data may be used in educational, marketing, advertising and other behavioral science studies. A de-facto standard of measuring audience or group behavior is via self-reports and surveys, which are often preferred due to the large number of people and complexities of the observed environment. However, these de-facto measurements are labor intensive, of limited scalability, and prone to mistakes and forgetfulness, as well as subjectivity. Further, these de-factor measurements cannot capture spontaneous reactions at a precise time-stamp. In addition, group behavior may be measured by wearable sensors which are invasive and unnatural.

BRIEF SUMMARY OF THE APPLICATION

Methods and systems for measuring group behavior are provided. Various embodiments may measure group behavior of different groups objectively and automatically. The groups may be of different sizes and located in different environments including a dark environment. In various embodiments, a uniform visible signal comprising images of members of a group is obtained. The images of the members of the group may comprise views of the members at different scales and viewpoints. Facial motions and body motions of each member may be detected and recognized from the uniform visible signal. In one embodiment, facial motion such as a smile is detected, by using the Fourier Lucas-Kanade (FLK) algorithm to locate and track the face position of each member of a group, which is subsequently used to derive facial features and subjected to a classifier to determine whether a group member was smiling or not. In another embodiment, a flow-profile for each member contained in his or her respective local 3D temporal volume is generated and is used for individual or group motion analysis.

A measurement of group behavior in response to a stimulus is provided. The group behavior may be temporally segmented. Change-points may be detected for each member of the group as well as for the group. A measure of similarity of group behavior, such as cross-correlation among every member of the group in response to the stimulus is measured, such as collective stillness measurements, synchronous movement measurements, collective facial motion and/or collective body motion measurements. An entropy of pair-wise correlation approach may be used to determine the synchrony of behavior between each member at the local level (i.e., a comparison between a pair of members) and at the global level (i.e., a comparison between a member and the group). Various embodiments analyze group behavior to determine a correlation of the group behavior and the content of the stimulus. In further embodiments, a prediction of the general public's response as well as the segmentation of the movie into periods when the audience was engaged and not engaged to the stimulus based on the analysis of the group behavior may be provided.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

FIG. 6A illustrates flow fields demonstrating an exemplary flow-based gesture analysis, such as for the method in FIG. 5.

FIG. 6B illustrates flow fields demonstrating an exemplary flow-based gesture analysis, such as for the method in FIG. 5.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Traditional sampling techniques may be rendered obsolete by providing digital technologies for a real-time, automatic and objective measurement of group or audience behavior. Monitoring based techniques are used to capture group or audience behavior. However, accurate measurement is difficult because detection and recognition of group or audience behavior can be hindered and interfered by various factors. Such factors can include the dark viewing environment, light reflecting from the movie screen, and non-uniform distributed seating which results in different views of members at different scales and viewpoints.

A group or audience behavior measurement measures audience behavior collectively. This is different from individual face detection used in technology areas such as consumer electronics, pain detection, driver fatigue, human-computer interaction and security and surveillance. In contrast to measurements limited to stimuli of short duration, (i.e., 10-60 seconds), group behavior measurements are performed continually over large periods time (i.e., from 5-10 minutes to 2-3 hours). An audience is a group of individual members that share an environment in which individual audience members can influence each other. As a result, a broad gamut of additional gestures and activities associated with boredom or disengagement (e.g., fidgeting, doodling, yawning, and indicators of inattentiveness), cannot be accurately measured or captured conventionally.

Methods and systems for automatically measuring collective behavior of a group in response to a stimulus are provided. For example, group behavior of a group watching visual stimuli (e.g., movies, TVs, videos, presentations, amusement park rides or attractions) can be measured. In various embodiments, a uniform visible signal of various groups of different sizes may be obtained. The groups may be located in different environments including a dark environment. Facial motions (e.g., smiles) as well as body gesture changes of each member are detected, collected, and recognized via a single video stream. In one embodiment, facial motions may be detected by using the Fourier Lucas-Kanade (FLK) algorithm to register faces of each member of the group. In another embodiment, a flow-profile for each member within his or her local 3D temporal volume is generated. Flow-profile of all members of a group may be aggregated into a collective group behavior measurement. In some embodiments, the collective or synchronous behavior of the audience is analyzed to indicate the extent of engagement or disengagement of the group during various segments of the stimulus.

Figure 1:
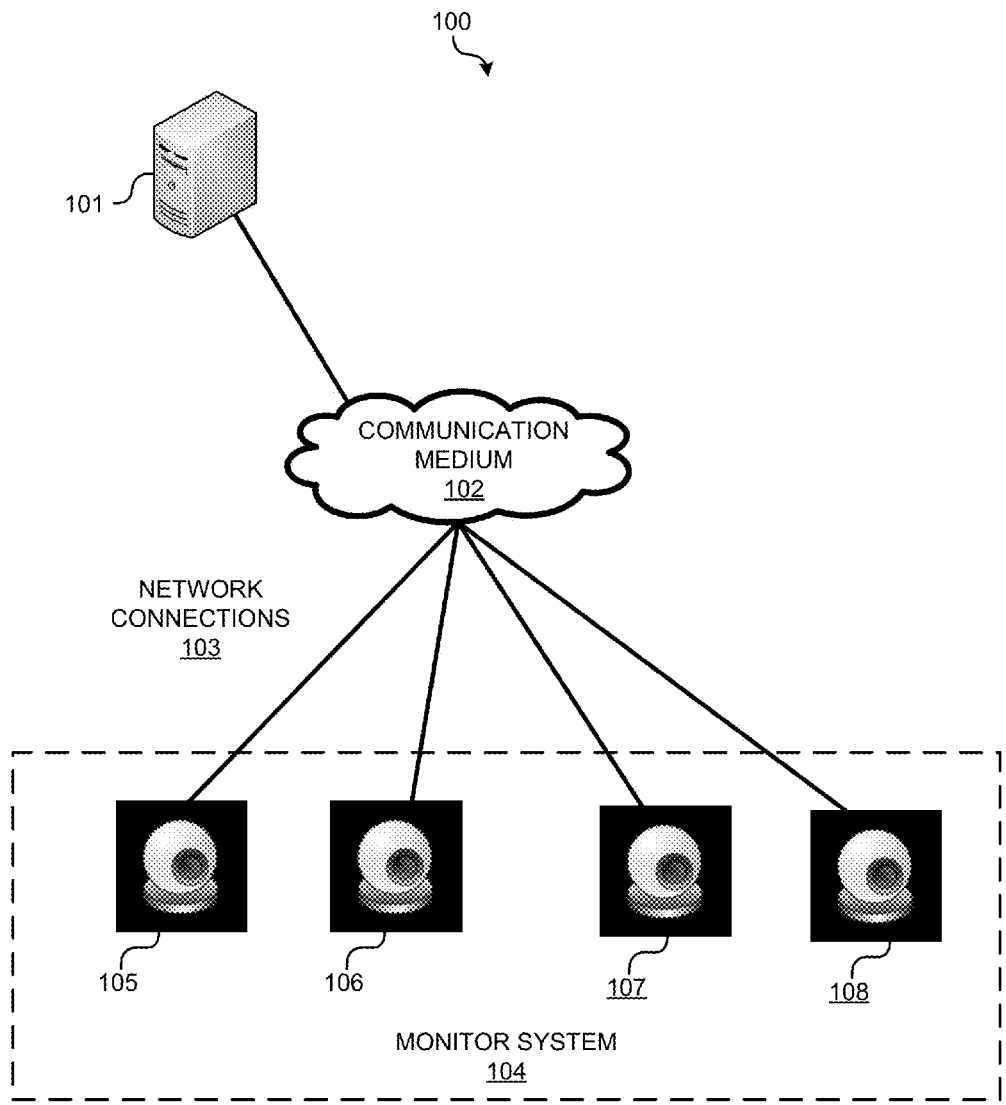
FIG. 1 illustrates an exemplary group behavior measurement system comprising various image sensors and a computing device.

FIG. 1 illustrates an exemplary group behavior measurement system 100 comprising various image sensors 105-108 and a computing device 101. The group behavior measurement system 100 may measure group behavior in response to a stimulus. The image sensors 105-108 may be collectively referred to as a monitor system 104, which is connected via a communication medium 102 to the computing device 101. In various embodiments, the image sensors 105-108 can include a camera, an Internet Protocol (IP) camera, an infra-red (IR) camera, and/or a webcam. A visual signal of a group may be generated by one or more image sensors 105-108. In various embodiments, the visual signal of a group comprises a sequence of images of the group. In one embodiment, the monitor system 104 may comprise a filter. The filter may be coupled to the image sensors 105-108 to remove the reflection from the stimulus display (such as a movie screen, a TV, an LCD display). As such, a uniform input signal is obtained. In one embodiment, the filter is an IR bandpass filter having a wavelength of 850 nm.

In some embodiments, the communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium. A network connection 103 may include wired connections (e.g., Digital Subscriber Line (DSL), optical) and/or wireless connections (e.g., Wi-Fi.) In various embodiments, a network connection 130 may include an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, or any combination thereof.

Various facial motion templates may be created and updated by the group behavior measurement system 100. Such facial motion templates may be used to recognize facial motion(s) appearing in an image. In various embodiments, a facial motion template may comprise a set of positive images showing the facial motion and a set of neutral images that do not show the facial motion. For example, a smile template may comprise a set of images with labeled smiles and a set of neutral images, and can be used as a basis to recognize smiles. The group behavior measurement system 100 may update the smile template by adding or deleting images from the facial motion template. In one embodiment, the group behavior measurement system 100 updates the template by training a linear support vector machine (SVM).

Various ground-truth templates may be created and updated by the group behavior measurement system 100. Such ground-truth templates may provide a basis for predicting a general public's response to a stimulus, that is, whether the general public will like the stimulus. For example, a ground-truth template for comedy may comprise a set of descriptions or labels describing the facial motions and body motions statistical data from a set of comedies and a correlation between the set of descriptions or labels in connection with the general public's favorable reception (such as a rating) to each comedy of the set of comedies. Examples of statistical data are the percentage of people smiling during a comedy rated at 8.5/10, the duration of smile during the comedy, the percentage of people who talk to others during the comedy, the percentage of people who check phones and watches during the comedy, the percentage of people who have large poses during the comedy, the percentage of people who eat or drink during the comedy, the percentage of people who watch through fingers during the comedy, the percentage of people who fall asleep during the comedy, the percentage of people who walk away during the comedy, and the percentage of people who have visual distraction during the comedy. The group behavior measurement system 100 may update the ground-truth templates by adding or deleting: descriptions or labels, the general public's favorable reception, and/or stimulus description (such as movies, movie genre, live events, sports, presentations, classes, types of class, etc.) from the ground-truth template.

Figure 2:
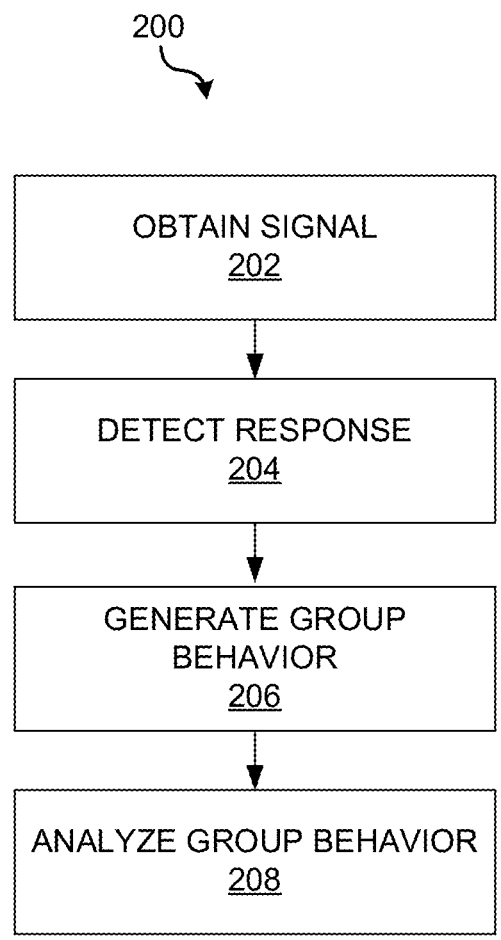
FIG. 2 is a flow diagram illustrating an exemplary method of measuring group behavior, such as for the group behavior measurement system in FIG. 1.

FIG. 2 is a flow diagram illustrating an exemplary method 200 of measuring group behavior, such as for the group behavior measurement system 100 in FIG. 1. At step 202, a signal capturing images of a group of individuals is obtained, for example, by one or more of the image sensors 105-108. The signal comprises a sequence of images of all members of the group. In various embodiments, each image of the sequence of the images included in the signal is processed. In one embodiment, the signal is obtained by capturing images of the group for at least one hour.

The group of individuals may be exposed to a stimulus, such as a movie, a presentation, a sport event, a class, and/or a theme park ride, etc. All members of a group may be located in the same common area such as a theatre, a classroom, a theme park, etc. All members of a group may be exposed to the stimulus at the same time but from different locations. All members of a group may be exposed to the stimulus in the same location but at different times. In some embodiments, the signal capturing the group is a uniform visible signal. In one configuration, variance in image quality (e.g., sharpness, noise, dynamic range, tone reproduction, color accuracy, distortion, vignetting, exposure accuracy, lateral chromatic aberration, lens flare, artifacts) of images of all members of the group is minimized.

At any time, the images of all members of the group are captured in a uniformly illuminated environment such that all members of the group of individuals are visible to the image sensors. In one embodiment, a low-light camera, a plurality of infra-red (IR) illuminators and an IR band-pass filter may be used to generate a uniform visible signal. In one embodiment, a low-light camera with exposure time of f/1.4 and 9 mm lens with a wider angle, illuminators having wavelength of 850 nm and 95° wider beam pattern, and an IR bandpass filter having a wavelength of 850 nm to filter reflections from a viewing screen are used.

At step 204, responses (such as facial motion, body motion, and/or voice) of each member of the group are detected. For example, the face of each member of the group is detected, and a facial motion is detected and recognized. A facial motion is a movement related to a person's face. In some embodiments, the detected and recognized facial motion may be tagged or marked with the corresponding time point of the stimulus. The face location of each member may be located by using a face detector. Face registration may be further performed. In one embodiment, a deformable face model with a dense mesh is used. In further embodiment, when the group size gets bigger and the resolution of some of the faces of the members is detected to be smaller than a predetermined value (e.g., 20×20 pixels), a bounding box is used. Members of the group may move and thus be susceptible to differing illumination conditions. For example, a member may lean backwards, then hunch over, then lean back again. Various embodiments may minimize impacts caused by such movement on image detection and face registration. In further embodiments, body motions of each member of the group are detected and recognized. A body motion profile may be created for each member of the group. Energy-based flow-profile measurement may be used to create individual flow-profile for measuring each member's body motion during the period of stimulus.

Subsequently, at step 206, group behavior is generated. Measurements of group behavior may indicate the interest or disinterest of the group in a stimulus. In various embodiments, an aggregate response may be generated by aggregating responses of all members of the group. This aggregate response may be used for determining the group behavior. Further, an amount of synchrony of a member's response relative to the aggregative response may be determined by comparing a member's response to the group response. This amount of synchrony demonstrates the synchrony or asynchrony of the member's response relative to the aggregate response, that is, whether a member's response is the same as the other members of the group.

The group behavior may be temporally segmented. The temporal segmentation may be achieved by using the change-point (CP) detection method. The CP detection method is an unsupervised temporal clustering method that may flag abrupt changes in a stochastic process. In some embodiments, the CP detection method is online (e.g., the generalized likelihood ratio), that receives signals only up to the current time-stamp. In other embodiments, the CP detection method is offline (e.g., the CUSUM), that receives signals over the entire period of stimulus. In various embodiments, each group member's response is segmented. A member change-point may be detected for each segmentation of each member's response and a group change-point may be determined for each segmentation. Audience behavior may be summarized from the group change-points.

In some embodiments, the aggregate response may be summarized into an overall response. A stimulus may be divided into a set of stimulus segments (e.g., one-minute time window). The strongest group change-point is determined and used as an index. A response time window (e.g., a one-second time window) of which is the index (i.e., the strongest group change-point) is used to summarize the group behavior for the corresponding stimulus segment. As such, the group behavior in response to the stimulus may be obtained by aggregating a set of group behavior summarized for each stimulus segment. For example, a group behavior in response to a 90-minute movie may be summarized by ninety (90) one-second response time windows, each of which is centered around the strongest group change-point for the corresponding one-minute movie segment. In some embodiments, an engaged stimulus segment having a corresponding stillness group behavior and a disengaged stimulus segment having a corresponding movement group behavior may be determined.

Depending on the area of interest, one aggregate response may be summarized into different overall responses. Each overall response provides an assessment of the group behavior from a particular perspective. The group behavior may be determined contingent on the corresponding query, such as time, demographics (e.g., females, males, people aged between 20 and 30), location, etc. For example, group behavior based on different levels of time may be determined. The aggregate response may be segregated based on the level of time. For example, an aggregate response over a period of ninety (90) minutes in response to a 90-minute stimulus may be broken into one minute time interval, and the one second with the most synchronized motion over that minute is summarized. As a result, a 90-second overall response is created for determining the group behavior in response the 90-minute stimulus.

In some embodiments, collective facial motions are generated based on detected and recognized facial motions of all members of the group. A synchrony of facial motions among all members of the group may be determined by using the time point tagged for each facial motion recognized for each member. In one embodiment, the synchrony of facial motions is determined using a face detector and template tracking methods such as Gabor FLK template tracking method. In some embodiments, collective facial motions (such as smile) may be computed with respect to the ground-truth. In various embodiments, group body motions are generated based on individual flow-profiles. Individual flow-profiles may be normalized, and cumulative distribution for the group may be generated.

At step 208, group behavior in connection with the stimulus is analyzed. In some embodiments, synchrony of facial motions and/or body motions in response to the stimulus is analyzed. In one embodiment, the synchrony of facial motions and/or body motions is compared with a ground-truth template to demonstrate correlation of the group behavior and the content of the stimulus. In various embodiments, an entropy of pair-wise correlation approach is used to detect the synchrony of behavior between members at the individual level (i.e., a pair-wise comparison) and/or the group level (i.e., a comparison between a member to the entire group).

Figure 3A:
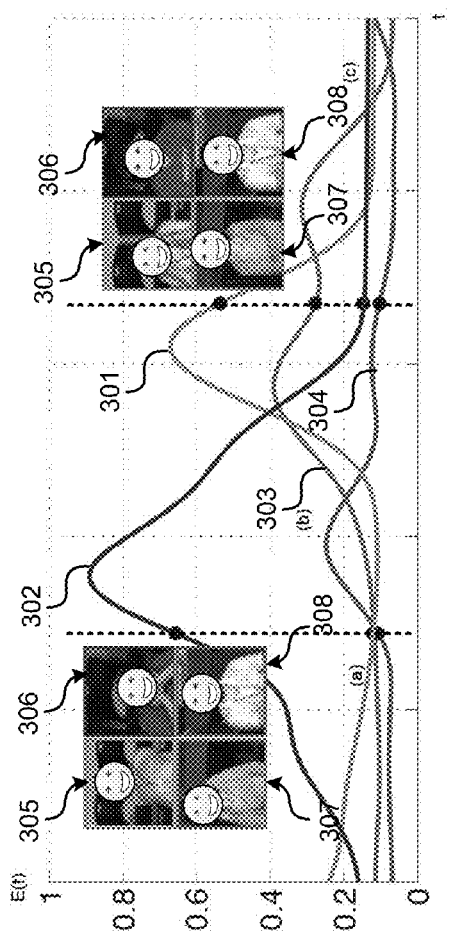
FIG. 3A illustrates cross-correlation of member's body motions demonstrating an exemplary group behavior generation and analysis, such as for the method in FIG. 2.
Figure 3B:
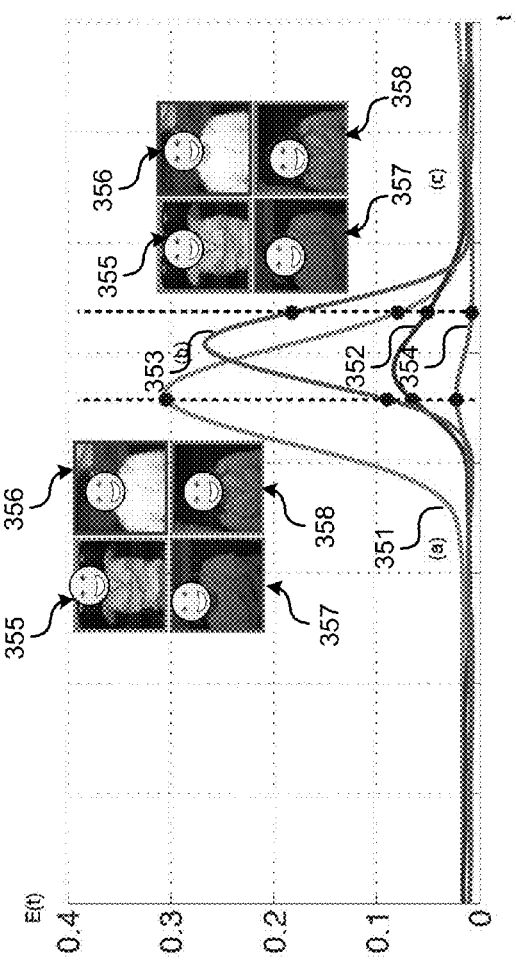
FIG. 3B illustrates cross-correlation of member's body motions demonstrating an exemplary group behavior generation and analysis, such as for the method in FIG. 2.
Figure 3C:
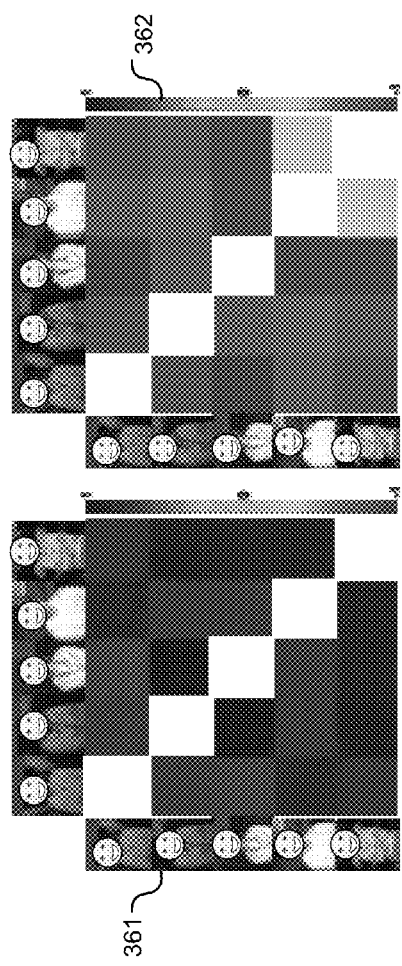
FIG. 3C illustrates a similarity matrix of a group demonstrating an exemplary group behavior generation and analysis, such as for the method in FIG. 2.
Figure 3D:
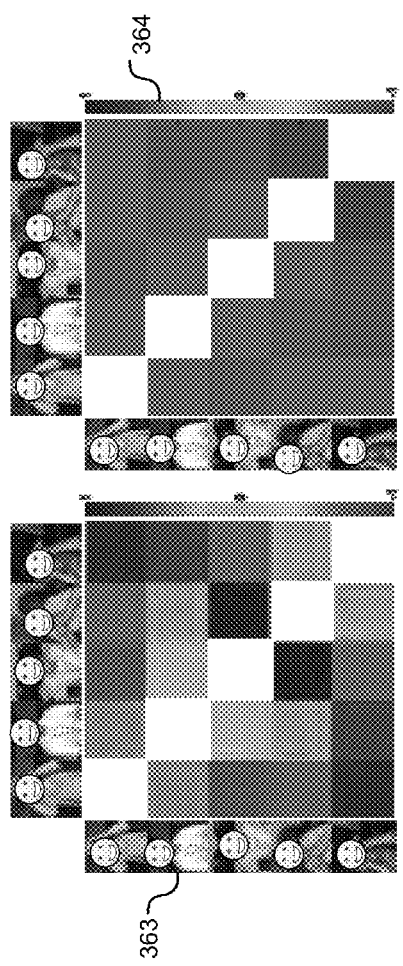
FIG. 3D illustrates a similarity matrix of a group demonstrating an exemplary group behavior generation and analysis, such as for the method in FIG. 2.

Further, a cross-correlation of the group behavior with the stimulus may be determined. This cross-correlation may be used to study group behavior relating to different types of stimuli for predicting a second group's response to the stimulus. For example, the cross-correlation between synchrony of facial motions and/or synchrony of body motions in response to changes in different features of the stimulus (such as a genre of the movie, a subject of the presentation), may be analyzed by a sliding window approach or using Bayesian or similar approach to detect change points in member's behavior. In one embodiment, how a movie may be rated by the general public is predicted. For example, crowd-sourced ratings of a movie may be used to learn audience behavior associated with different movie prediction ratings. A normalized measure based on the pair-wise correlations between group members and the entropy of the pair-wise correlations may be developed and used as a basis for predicting the general public's response to a stimulus. FIGS. 3A-3B illustrate cross-correlation of member's body motions demonstrating a group behavior generation and analysis, such as for the method in FIG. 2. FIGS. 3C-3D illustrates the similarity matrices of a group demonstrating a group behavior generation and analysis, such as for the method in FIG. 2. Various embodiments use only body behavior to generate and analyze group behavior because body motions are more robust than facial motions. A member's change-point may be detected. In various embodiments, a member's energy signal s, smoothed over a time period (e.g., 6 seconds) may be provided and the first-order derivative of the energy signal $$\Phi = \frac{ds}{dt}.$$

The positive peaks p and negative peaks n may be determined by detecting zero crossing values of the second-order derivative $$\frac{d\Phi}{dt}$$

for a given threshold $\theta = \mu_s + K\delta_s$, where $\mu_s$ is the mean of the energy signal s, $\delta_s$ is the standard deviation of the energy signal s, and K is a constant. The constant K may be a value in the range of between 0 and 1, depending on the range of the input signal.

The CPs may be determined by maximizing the Equations (1) and (2):

$$\forall i, \alpha \leq i < \tau: \operatorname*{argmax}_i \left\{ \frac{s_i - s_{p_\tau}}{s_{p_\tau}} \right\} \quad (1)$$

$$\forall j, \tau \leq i < \beta: \operatorname*{argmax}_j \left\{ \frac{s_j - s_{n_\tau}}{s_{n_\tau}} \right\} \quad (2)$$

where $\alpha$ and $\beta$ are lower and upper bounds around each peak (e.g., 15 frames), respectively. CPs i and j where the amplitude of the energy signal s increases and decreases significantly may be detected by using Equations (1) and (2), respectively.

Members of a group may behave differently in various segments of a stimulus. The behaviors may be classified as stillness or movement. A normalized group energy signal $X = \{x_1, x_2, \ldots, x_N\}$, smoothed over a time period (e.g., 6 seconds) may be provided, where N is the number of members of the group. The first-order derivative $$\frac{dx_i}{dt}$$

for each $x_i$ may be calculated and used to obtain a signal $$z = \sum_{i=1}^{N} \frac{dx_i}{dt}.$$

The group CPs which are the zero-crossing values in the signal z for a given threshold.

FIGS. 3A-3B illustrate the group CPs representing the group behavior in response to different stimuli, respectively. In FIG. 3A, lines 301-304 represent body motion of members 305-308 in response to a first stimulus over time, respectively. In FIG. 3B, lines 351-354 represent body motion of members 355-358 in response to a second stimulus over time, respectively. A region between an increasing synchrony point and a decreasing synchrony point may indicate group movement, and a region between a decreasing synchrony point and an increasing synchrony point may indicate group stillness. As illustrated, body motions of members 355-358 in response to the second stimulus are more synchronized than body motions of members 305-308 in response to the first stimulus.

FIGS. 3C-3D illustrate similarity matrixes of a group demonstrating a group behavior generation and analysis, such as for the method in FIG. 2. Graphs 361 and 363 illustrate the similarity matrixes for a group during a movement segment whereas graphs 362 and 364 illustrate the similarity matrixes for a group during a stillness segment. In various embodiments, an entropy of pair-wise correlation approach is used to detect the synchrony of behavior between members at the individual level (i.e., a comparison between two members of a group) and/or the group level (i.e., a comparison between a member and the group). Responses of two members over a segment (e.g., 30 sec onds), $s_1$ and $s_2$ may be compared and used to calculate the pair-wise correlation according to Equation (3):

$$C_{s_1 s_2} = \exp\left(\frac{-\|s_1 - s_2\|^2}{2\sigma^2}\right) \qquad (3)$$

where σ is an adjustable parameter for each similarity matrix (e.g., σ=1). A similarity matrix may be generated by exhaustively calculating all the pair-wise correlations for all members of a group.

As illustrated in FIG. 3C, movement and stillness among members of the group are highly correlated. However, movement and stillness among members of the group are much less correlated as illustrated in FIG. 3D. Group disorder may be measured via entropy by using Equation (4):

$$H(X) = -\sum_{i=0}^{N-1} p(i) \log p(i), \qquad (4)$$

where X is the similarity matrix of piece-wise correlations, p(x) is a probability distribution of X for a corresponding time-segment. A high value of entropy may demonstrate that there is a great disorder (e.g., random) behavior, whereas a low value of entropy may demonstrate that there is cohesion or predictability of behavior.

This cross-correlation between the collective changes in the group behavior may be associated with the corresponding feature of the stimulus. In further embodiments, predictions of the group's response to a different stimulus having the same feature may be determined. For example, a group's response to a comedy that they have never seen may be predicted by using the cross-correlation of the group's group behavior with a comedy they have seen. In one embodiment, a cross-correlation confidence score is computed for the stimulus. In further embodiments, change points may be detected by using Bayesian approaches to demonstrate correlation between synchrony of facial motions and synchrony of body motions In further embodiments, a prediction of the general public's response to the stimulus may be determined by using the group behavior generated at step 206 or the analysis of the group behavior conducted at step 208. Ground-truth templates may be provided as a basis for predicting the general public's response to the stimulus. The prediction may be performed by using multiple relevant ground-truth templates. Each relevant ground-truth template is based on a field of interest of the stimulus, such as the genre of a movie, the target-audience of a TV show, the industry of the product of a commercial, the subject of a class, etc.

Various embodiments may predict the general public's response to a stimuli, such as crowd-sourced ratings of a movie. For example, various websites (e.g., www.rottentomato.com) provide an interactive feature that allow people to rate a movie online. Audience measure may be generated when the number of ratings aggregate over time. An average audience measure may be obtained from these existing ratings. For example, a movie rated at 75% or higher is deemed a good movie, a movie rated between 50-75% is deemed an average movie, and a movie rated below 50% is deemed a bad movie. In further embodiments, the prediction of the movie rating may be performed using a discriminative classifier such as support vector regression, where examples of behaviors that discriminate between different movie ratings can be learned and used as a basis for predictions of movie ratings.

A normalized measure may be developed by using the mean of the similarity matrix at each time step, $M_t$ and the entropy of the similarity matrix $E_t$. A normalized rating measure R may for a stimulus (e.g., a movie) may be determined according to Equation (5):

$$R = \frac{1}{T}\sum_{t=1}^{T} \frac{M_t}{E_t}, \qquad (5)$$

where T is the number of segments analyzed.

Figure 4:
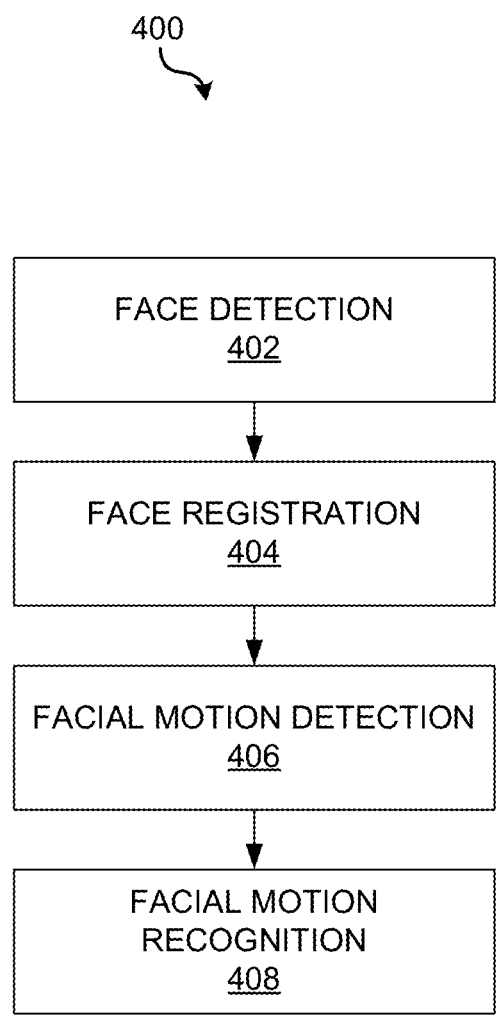
FIG. 4 illustrates an exemplary method of detecting and identifying an individual's facial motions, such as for the method in FIG. 2.

FIG. 4 illustrates an exemplary method 400 of detecting and identifying an individual's facial motions, such as for the method 200 in FIG. 2. At step 402, an individual's face in the image is detected by using a face detector. The individual's face relevant location in the image is localized. At step 404, face registration of the individual's face is performed. In one embodiment, a deformable face model with a dense mesh is used. In another embodiment, a bounding box (e.g., 20×20 pixels) is used. In further embodiments, as an individual's face relative location in the image may change over time, tracking algorithm may be performed to track the individual's face movement and ensure smooth and accurate face registration.

In one embodiment, Lucas-Kanade (LK) template is used to find the parametric p that minimizes the sum of squared difference (SSD) between a template image T and a warped source image I. The error term can be written as Equation (6):

$$\underset{p}{\operatorname{argmin}} \|I(p) - T(0)\|^2 \qquad (6)$$

where I(p) represents the warped input image using the warp specified by the parameters p, and T(0) represents the un-warped template image. The LK algorithm finds an effective solution to Equation (6), by iteratively solving for Δp and refining the parameters at each iteration till converge such that p←p+Δp.

The non-linear Equation (6) may be linearized by performing Taylor series as illustrated in Equation (7):

$$\underset{\Delta p}{\operatorname{argmin}} \|I(p) + J\Delta p - T(0)\|^2 \qquad (7)$$

where the Jacobian matrix $$J = \left(\frac{\partial I(p)^T}{\partial p}\right).$$

The explicit solution for Δp, that minimizes the linearized objective function in Equation (7) is illustrated in Equation (8):

$$\Delta p = H^{-1} J^T [T(0) - I(p)] \qquad (8)$$

where the pseudo Hessian matrix H is defined as $H=J^T J$.

In another embodiment, the inverse compositional (IC) algorithm may be used to minimize the SSD objective function described in Equation (6). The IC algorithm linearizes T(Δp) resulting in Equation (9):

$$\underset{\Delta p}{\operatorname{argmin}} \left\| I(p) - T(0) - \frac{\partial T(0)^T}{\partial p} \right\|^2 \quad (9)$$

Since $$\frac{\partial T(0)}{\partial p}$$

needs only to be computed once, irrespective of the current value of p, the linearized objective function described in Equation (10) may be solved instead.

$$\Delta p = B[I(p) - T(0)] \quad (10)$$

where matrix B is given in Equation (11):

$$B = H_{iC}^{-1} \frac{\partial T(0)}{\partial p} \quad (11)$$

And the pseudo Hessian matrix can be defined as $$H_{iC} = \frac{\partial T(0)}{\partial p} \frac{\partial T(0)^T}{\partial p}.$$

The current warp parameters are iteratively updated by the inverse of the incremental update warp p←p∘Δp$^{-1}$. The operation ∘ represents the composition of two warps.

In another embodiment, Fourier Inverse Compositional Algorithm is used to minimize the SSD objective function described in Equation (6). The IC algorithm linearizes T(Δp) resulting in Equation (9). Since $$\frac{\partial T(0)}{\partial p}$$

needs only to be computed once, irrespective of the current value of p, the linearized objective function described in Equation (10) may be used instead, where matrix B is given in Equation (12):

$$B = H_{flk(ic)}^{-1} (FJ_{ic})^T SF \quad (12)$$

The Jacobian $J_{ic}$ depends only on the template image, that is, $$J_{ic} = \left(\frac{\partial T(0)}{\partial p}\right)^T$$

remains constant across all iterations. Consequently, the pseudo-Hessian $H_{flk(ic)} = J_{ic}^T F^T SFJ_{ic}$ remains constant for all iterations.

In a further embodiment, Fourier Lucas-Kanade Algorithm is used for fitting a template across multiple filter responses in the Fourier domain, which can be described in Equation (13):

$$\underset{p}{\operatorname{argmin}} \left\| \hat{I}(p) - \hat{T}(0) \right\|_S^2 \quad (13)$$

where $$S = \sum_{i=1}^{M} (\operatorname{diag}(\hat{g}_i))^T \operatorname{diag}(\hat{g}_i) \quad (14)$$

and $\hat{I}(p)$, $\hat{T}(0)$, $\hat{g}_i$ are the 2D Fourier transforms of vectorized images I(p) and T(0) and the choice of filters $g_i$, respectively. Equation (13) can be described with a matrix F which contains the Fourier basis vectors, resulting in Equation (15):

$$\underset{p}{\operatorname{argmin}} \| I(p) - T(0) \|_{F^T SF}^2 \quad (15)$$

Subsequently, at step 406, an individual's facial motions in response to the stimulus is detected. For example, facial motions such as smile, frown, eye roll, smirk, and/or wink may be detected. In various embodiments, a facial motion template may comprise a subset of positive images showing the facial motion and a subset of neutral images that do not show the facial motion. In one embodiment, HOG features are extracted by using nine orientation bins with overlapping regions having block size of 2×2 pixels and cell size of 8×8 pixels.

In one embodiment, facial motions of the individual in the image are detected by using feature descriptors such as histogram of oriented gradients (HOG). The detected facial motion may be compared to a set of facial motion templates for identification of the facial motion. In one embodiment, the recognized facial motion is the facial motion template that best matches the detected facial motion. The detected and recognized facial motions may be used to train a linear support vector machine (SVM) classifier to create and/or update facial motion templates. In one embodiment, using the SVM classifier, the best match facial motion template is determined by picking the example which is furthest away from the decision hyperplane. Accordingly, facial motion templates may be constantly updated. In various embodiments, tracking strategies that use the IC algorithm, the FLK algorithm, the FLC algorithm, or any combination thereof may find the best match to a facial motion template from the set of facial motion templates in every frame of the signal.

In various embodiments, one or more facial motions may be detected. For example, in one embodiment, a smile is detected. A smile may be the most reliable emotion that accurately reflects a human's sentiments when analyzing his or her engagement with commercials.

Figure 5:
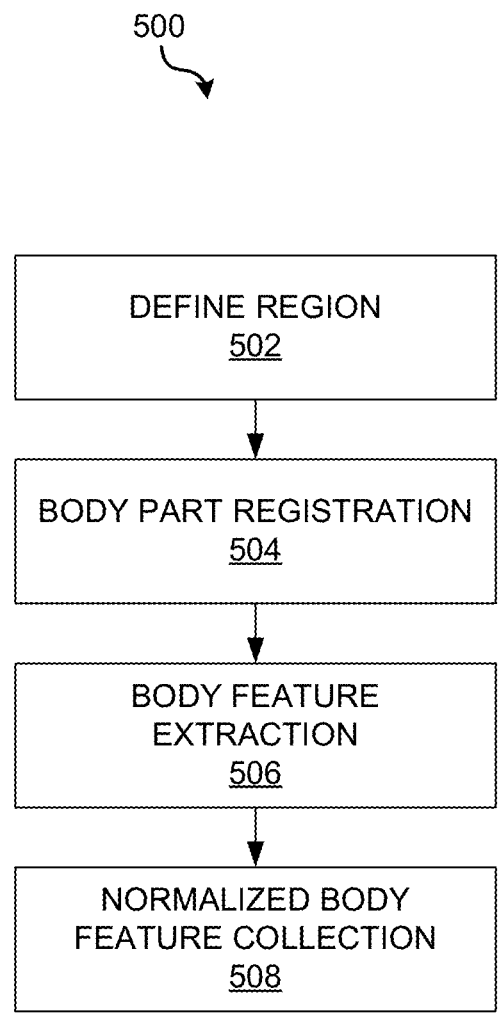
FIG. 5 illustrates an exemplary method of detecting and identifying an individual's body motions, such as for the method in FIG. 2.

FIG. 5 illustrates an exemplary method 500 of detecting and identifying an individual's body motions, such as for the method 200 in FIG. 2. In various embodiments, a body motion profile is created for each member of the group. At step 502, a region in which an individual is located is defined. At step 504, an individual's body part (such as an arm, a leg, a hand, a torso) in the image is registered. For example, the body part is detected by using a body part detector and subsequently tracked. In one embodiment, a deformable body part model with a dense mesh is used. In another embodiment, a bounding box is used. In further embodiments, as an individual's body part's relative location in the image may change over time, tracking algorithm may be performed to track the body part movement and ensure smooth and accurate body part registration.

At step 506, the body feature of each body part is extracted. In one embodiment, a normalized region based on a registered body part (e.g., face) may be defined. Motion features may be calculated based on this normalized region. The movement of each part of a member or an individual may be measured. In one embodiment, the measurement is the three-dimensional (3D) displacement. At step 508, the normalized body feature including the body motion for each part of the body is calculated.

FIG. 6A-6B are flow fields illustrating an exemplary flow-based gesture analysis, such as for the method 500 illustrated in FIG. 5. FIG. 6A illustrates flow fields for an individual engaged in a first movie and FIG. 6B illustrates flow fields for the individual engaged in a second movie. In various embodiments, a flow-profile is generated for each member of the group. The flow-profile is energy based and may be used to measure the synchronous body motion of the group such as a collective stillness or a collective coherency of the group. In one embodiment, a local 3D temporal volume Q for each member of the group in the horizontal and vertical directions x and y over the time t is Q=f(x,y,t). A flow-profile may be generated for each member within his or her 3D temporal volume using optical flow components $V_x$ and $V_y$, respectively. Accordingly, the normalized local 3D energy for each member q is given in Equation (16):

$$E_{q,t} = \frac{1}{a_q}\sqrt{V_{q,x,t}^2 + V_{q,y,t}^2} \quad (16)$$

Where $a_q$ is the area defined for a member to move over the time. The normalized energy can be vectorized over the duration of the stimulus T as:

$$e_q = [E_{q,1}, E_{q,2}, \ldots, E_{q,T}] \quad (17)$$

Graphs 601 and 604 illustrate the average flow vectors for the same individual in response to the first and second movies, respectively. Compared with graph 604, vectors illustrated in graph 601 have higher amplitudes. Graphs 602 and 605 illustrate the average flow magnitude for the same individual in response to the first and second movies, respectively. Compared with graph 605, the average flow magnitude illustrated is higher in graph 602. Accordingly, the individual has a comparatively high energy or body motion in response to the second movie than to the first movie. This can be further illustrated in graphs 603 and 606, where normalized energy profiles over the duration of the stimulus. Compared with graph 603, the normalized energy profile illustrated in graph 606 has more frequent changes and higher magnitudes.

A normalized measure of overall group engagement over the duration of a stimulus period T, which can be used to indicate engagement and disengagement is provided in Equation (18):

$$e_{stimulus} = \frac{1}{N}\sum_{q=1}^{N} e_q \quad (18)$$

Figure 7:
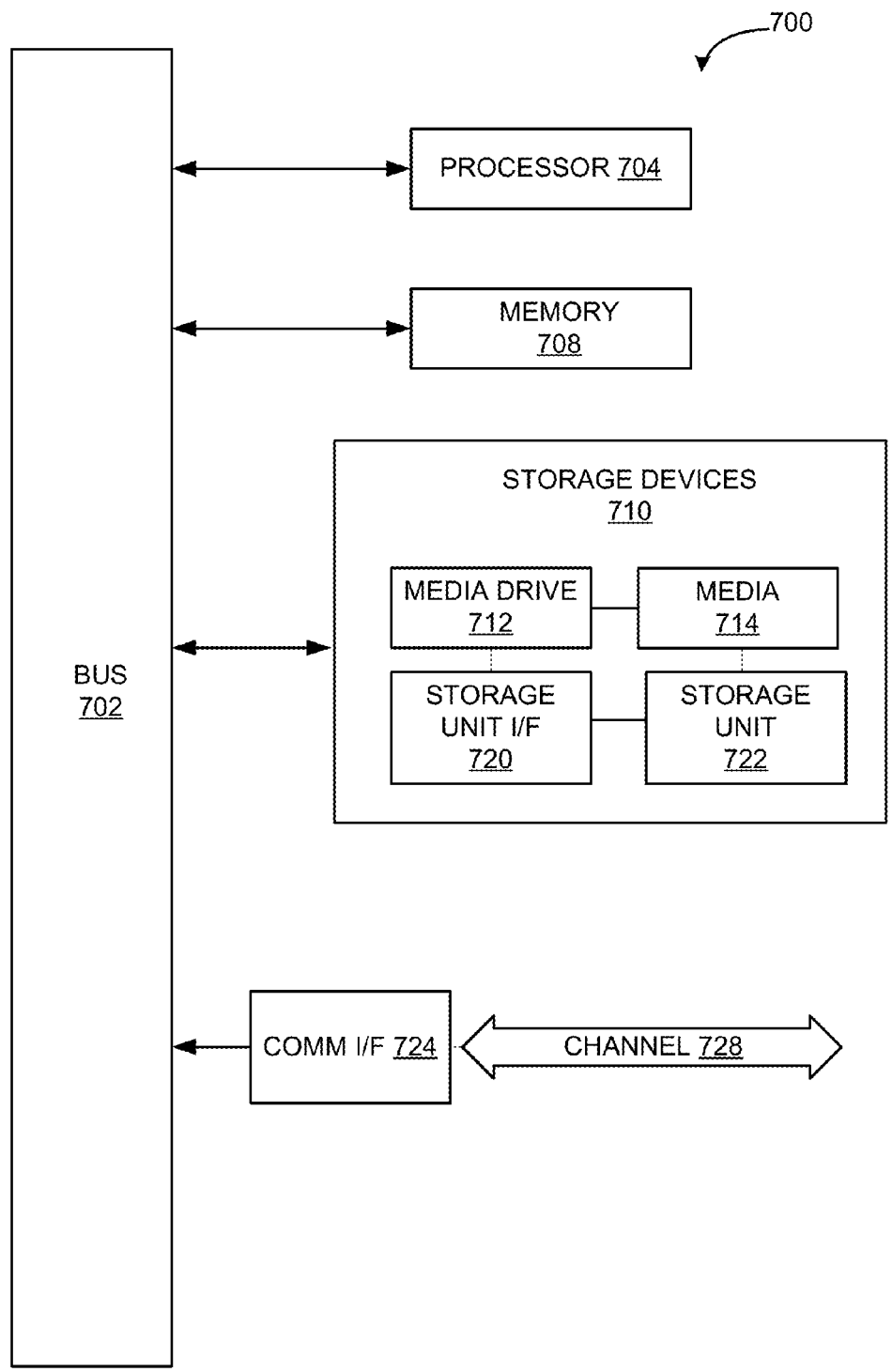
FIG. 7 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 500. After reading this description, it will become apparent to a person skilled in the relevant art how to implement the application using other computing modules or architectures.

Referring now to FIG. 7, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

While various embodiments of the present application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of measuring group behavior, comprising:
obtaining a signal comprising a sequence of images of a group having a plurality of members, wherein the group is exposed to a stimulus;
detecting a response of each member of the group to the stimulus over a period;
generating an aggregate response to the stimulus by aggregating the response of each member of the group; and
generating a group behavior measurement by determining an amount of synchrony of the response of each member relative to the aggregate response, wherein the step of generating the group behavior comprises:
generating a similarity matrix by determining a pairwise correlation between two members of the group for a segment of the period; and
determining an entropy of the similarity matrix to measure the group behavior.

2. The method of claim 1, further comprising predicting a second group's response to the stimulus based on the group behavior.

3. The method of claim 2, wherein the second group's response is a crowd-sourced rating of the stimulus.

4. The method of claim 3, wherein the step of predicting the second group's response comprises using a discriminative classifier to predict a crowd-sourced rating of the stimulus.

5. The method of claim 2, wherein the group behavior comprises a collective coherency measurement corresponding to an engaged stimulus segment.

6. The method of claim 1, wherein the step of generating an aggregate response to the stimulus comprises detecting a set of change-points for the response of each member of the group for the segment.

7. The method of claim 1, wherein the step of generating the group behavior further comprises predicting a second group's response to the stimulus based on the entropy.

8. The method of claim 1, wherein the period exceeds ten minutes.

9. The method of claim 1, wherein the signal is a uniform visible signal.

10. The method of claim 9, wherein the uniform visible signal is an output of an infra-red (IR) bandpass filter.

11. The method of claim 1, wherein the step of detecting a response of each member comprises:
detecting a face of each member;
registering the face of each member;
detecting a facial motion of each member; and
recognizing the facial motion of each member by comparing the facial motion detected to a set of facial motion templates.

12. The method of claim 11, wherein the step of aggregating the response of each member comprises detecting a synchrony of the facial motion among all members of the group.

13. The method of claim 1, wherein the step of detecting a response of each member comprises creating a body motion profile for each member comprising:
extracting and registering each part of a body of each member;
measuring a movement of each part of the body by measuring a three-dimensional (3D) displacement; and
calculating a normalized motion for each part of the body.

14. The method of claim 13, wherein the step of measuring the movement of each part comprises:
initializing a local temporal 3D volume for each member;
generating a flow-profile of each member contained within the corresponding temporal 3D volume; and
calculating a normalized local 3D energy for each member.

15. The method of claim 14, wherein the step of aggregating the response of each member comprises determining a normalized 3D energy for the group based on the normalized local 3D energy for each member of the group.

16. The method of claim 1, further comprising associating the group behavior with the stimulus.

17. The method of claim 1, further comprising detecting a collective change in the group behavior in response to a change of an input feature of the stimulus.

18. The method of claim 1, wherein all members of the group are exposed to the stimulus in an environment.

19. The method of claim 18, wherein a first member is exposed to the stimulus at a first time and a second member is exposed to the stimulus at a second time, and the first time is different from the second time.

20. The method of claim 1, wherein all members of the group are exposed to the stimulus at the same time, a first member of the group is in a first environment and a second member of the group is in a second environment when being exposed to the stimulus, the first environment is different from the second environment.

21. A system of measuring group behavior, comprising:
non-transitory memory storing a set of instructions; and
a processor coupled to the non-transitory memory, wherein the set of instructions are configured to cause the processor to:
obtain a signal comprising a sequence of images of a group having a plurality of members, wherein the group is exposed to a stimulus;
detect a response of each member of the group to the stimulus over a period; and
generate an aggregate response in response to the stimulus by aggregating the response of each member of the group; and
generate a group behavior measurement by determining an amount of synchrony of the response of each member relative to the aggregate response, wherein the step of generating the group behavior comprises:
generating a similarity matrix by determining a pairwise correlation between two members of the group for a segment of the period; and
determining an entropy of the similarity matrix to measure the group behavior.

22. The system of claim 21, wherein the signal is a uniform visible signal.

23. The system of claim 22, wherein the uniform visible signal is an output of an infra-red (IR) bandpass filter.

24. The system of claim 21, wherein the step of detecting a response of each member comprises:
- detecting a face of each member;
- registering the face of each member;
- detecting a facial motion of each member; and
- recognizing the facial motion of each member by comparing the facial motion detected to a set of facial motion templates.

25. The system of claim 24, wherein the step of aggregating the response of each member comprises detecting a synchrony of the facial motion among all members of the group.

26. The system of claim 21, wherein the step of detecting a response of each member comprises creating a flow profile for each member comprising:
- initializing a local 3D volume for each member;
- generating a flow-profile of each member contained within the corresponding 3D volume; and
- calculating a normalized local 3D energy for each member.

27. The system of claim 26, wherein the step of aggregating the response of each member comprises determining a normalized 3D energy for the group based on the normalized local 3D energy for each member of the group.

28. A method of measuring group behavior, comprising:
- obtaining a signal comprising a sequence of images of a group having a plurality of members, wherein the group is exposed to a stimulus;
- detecting a response of each member of the group to the stimulus over a period;
- generating an aggregate response to the stimulus by aggregating the response of each member of the group; and
- generating a group behavior measurement by determining an amount of synchrony of the response of each member relative to the aggregate response, wherein the step of generating the group behavior comprises:
- segregating the response of each member over the period into a plurality of responses over a first set of time intervals, each time interval of the first set of time intervals comprising a second set of time intervals;
- calculating an amount of synchrony among all members for each time interval of the second set of time intervals;
- determining a time interval of the second set of time intervals having the largest amount of synchrony among all members;
- finding a group response for each time interval of the first set of time intervals by summarizing responses of all members of the group over the time interval of the second set of time intervals; and
- summarizing the group response for all time intervals of the first time interval.

* * * * *